United States Patent
Marejka et al.

(10) Patent No.: US 7,231,455 B2
(45) Date of Patent: Jun. 12, 2007

(54) SYSTEM MONITORING SERVICE USING THROTTLE MECHANISMS TO MANAGE DATA LOADS AND TIMING

(75) Inventors: Richard Marejka, Nobleton (CA); Dean Kemp, Superior, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 714 days.

(21) Appl. No.: 10/179,752

(22) Filed: Jun. 25, 2002

(65) Prior Publication Data

US 2003/0135639 A1 Jul. 17, 2003

Related U.S. Application Data

(60) Provisional application No. 60/377,167, filed on Apr. 30, 2002, provisional application No. 60/348,700, filed on Jan. 14, 2002.

(51) Int. Cl.
*G06F 15/16* (2006.01)

(52) U.S. Cl. .................................... 709/233; 709/230

(58) Field of Classification Search ................ 709/230, 709/233
See application file for complete search history.

(56) References Cited

U.S. PATENT DOCUMENTS

| | | | |
|---|---|---|---|
| 5,687,483 A * | 11/1997 | Neubert et al. ............... 30/312 |
| 6,005,926 A * | 12/1999 | Mashinsky ............. 379/114.02 |
| 6,115,393 A * | 9/2000 | Engel et al. ................. 370/469 |
| 6,188,670 B1 | 2/2001 | Lackman et al. |
| 6,208,619 B1 | 3/2001 | Takeuchi |
| 6,222,856 B1 * | 4/2001 | Krishnan et al. ........... 370/468 |
| 6,243,360 B1 | 6/2001 | Basilico |
| 6,272,522 B1 | 8/2001 | Lin et al. |
| 6,317,415 B1 | 11/2001 | Darnell et al. |
| 6,324,184 B1 | 11/2001 | Hou et al. |
| 6,336,141 B1 | 1/2002 | Fujiyama et al. |
| 6,633,835 B1 * | 10/2003 | Moran et al. ................ 702/190 |
| 6,667,985 B1 * | 12/2003 | Drummond-Murray ..... 370/415 |
| 6,684,237 B1 * | 1/2004 | Preissman .................... 709/200 |
| 2002/0174217 A1 * | 11/2002 | Anderson .................... 709/224 |
| 2004/0236846 A1 * | 11/2004 | Alvarez et al. ............. 709/223 |
| 2005/0108398 A1 * | 5/2005 | Levanoni et al. ........... 709/225 |
| 2005/0108422 A1 * | 5/2005 | Krishnan .................... 709/233 |

* cited by examiner

*Primary Examiner*—Rupal Dharia
*Assistant Examiner*—Chirag R Patel
(74) *Attorney, Agent, or Firm*—Kent A. Lembke; William J. Kubida; Hogan & Hartson LLP (57) ABSTRACT

A system and method for throttling transmissions of gathered computer system monitoring and asset data within a customer's communications network. A relay is provided within the network with an interface for transmitting messages to a downstream device such as the Internet. A data transmission throttle controls the downstream interface to transmit data at or below a data transfer threshold defining an allowable data transfer volume per transmission period. The method includes receiving customer input and modifying the data transfer threshold based on the input, with thresholds being set for a matrix of transmission periods (such as 24 hour by 7 day). The data transmission throttle determines whether messages exceed thresholds for the current transmission period, such as by comparing the size of the message to a data flow counter, and controls data transmissions by the relay to not exceed the threshold and by resetting the counter for each threshold.

16 Claims, 4 Drawing Sheets

SYSTEM MONITORING SERVICE USING THROTTLE MECHANISMS TO MANAGE DATA LOADS AND TIMING

CROSS-REFERENCE TO RELATED APPLICATIONS

This application claims the benefit of U.S. Provisional Application No. 60/348,700, filed Jan. 14, 2002, and U.S. Provisional Application No. 60/377,167, filed Apr. 30, 2002, entitled "System Monitoring Service Using Throttle Mechanisms to Manage Data Loads and Timing," the disclosures of which are herein specifically incorporated in their entirety by this reference.

BACKGROUND OF THE INVENTION

1. Field of the Invention

The present invention relates, in general, to computer system and network monitoring and reporting software and systems, and more particularly, to a method and system for controlling communication loads and timing in a network of client and service provider devices that utilizes a cascaded pipeline with a plurality of relays to provide a reliable store and forward mechanism with priority messaging and includes one or more throttle mechanisms for controlling network usage at one or more relays in the pipeline.

2. Relevant Background

The need for effective and cost efficient monitoring and control of servers and their clients and computer network components, i.e., systems management, continues to grow at a rapid pace in all areas of commerce. There are many reasons system management solutions are adopted by companies including reducing customer and service downtime to improve customer service and staff and customer productivity, reducing computer and network costs, and reducing operating expenditures (including reducing support and maintenance staff needs). A recent computer industry study found that the average cost per hour of system downtime for companies was $90,000 with each company experiencing 9 or more hours of mission-critical system downtime per year. For these and other reasons, the market for system monitoring and management tools has increased dramatically and with this increased demand has come pressure for more effective and user-friendly tools and features.

There are a number of problems and limitations associated with existing system monitoring and management tools. Generally, these tools require that software and agents be resident on the monitored systems and network devices to collect configuration and operating data and to control communications among the monitored devices, control and monitoring consoles, and a central, remote service provider. Data collected on the monitored systems is displayed on the monitoring console or client node with tools providing alerts via visual displays, emails, and page messages upon the detection of an operating problem. While providing useful information to a client operator (e.g., self-monitoring by client personnel), these tools often require a relatively large amount of system memory and operating time (e.g., in excess of 2 percent of device processing time).

Additionally, the volume of data and messages sent between monitored systems and the service provider server can include very large files, such as configuration and asset files, which results in congestion of data communication networks. This can be a significant problem at connections between the customer environment and public networks, such as the Internet, that may have volume limits or that may increase usage charges based on such spikes in data transmission volumes. Further, filling the customer communication networks with large data loads can result in communications that are important or even essential to the customer's business being slowed, temporarily delayed, or even lost. For most businesses, loss or slowing of data transmissions is unacceptable, especially during their core hours. For example, e-commerce businesses rely on both timely communications and reliable communications, e.g., secure communications with no or little loss of data. In addition to data volume problems, the timing of the transmissions of the gathered monitoring and asset data to the service provider can vary significantly over time in many monitoring systems leading to unpredictable congestion within the network. Again, delays and losses of communications within the network result from the large increases in network usage that occurs at unexpected and undesirable times for the affected business.

Hence, there remains a need for an improved system and method for monitoring computer systems that addresses the need for reliable and secure data and message transmissions. Such a system and method preferably would reliably and timely transfer commands, alarms or alerts, monitoring data, and asset and configuration data to facilitate timely monitoring of computer and network operations. Additionally, such a method and system would preferably effectively manage communication network usage within the customer's environment and at the interface between the customer's environment and public networks to minimize disruptions to the customer's ability to utilize its internal communication network and external or public communication connections.

SUMMARY OF THE INVENTION

The present invention provides a self-monitoring service system that provides a scalable solution to delivering self-service solutions including system monitoring, trend reporting, asset tracking, and asset change reporting. Briefly, the system of the invention utilizes a cascaded pipeline architecture including linked monitored relays, forwarding relays, and Internet relays. The monitored relays are end nodes such as monitored systems connected to the pipeline. The forwarding relays positioned downstream of the monitored relays and configured to support 1 to 500 or more monitored relays by functioning to forward and fan out the delivery of self-monitoring and other tools to customers. The Internet or customer relays are positioned downstream of the forwarding relays and are the final point within the customer environment or network. The Internet relays function to send messages from the monitored systems and gathered monitoring and asset data to the service provider system. The pipeline of the service system is adapted to be a reliable store and forward mechanism with priority-based messaging. For example, in one embodiment, a message of higher priority is sent through the pipeline in the middle of a lower priority message. In this example, the lower priority message is typically temporarily suspended and transmission is resumed when messages with its priority or priority level are allowed to be sent in the pipeline.

According to one aspect of the invention, a throttle mechanism is provided in one or more of the relay mechanisms to control usage of and data flow within the system and specifically, within a customer's environment. The throttle mechanism is adapted to be included in the forwarding or fan out relays and/or in the customer or Internet relays to enable an operator of the customer environment or network to control network usage of the pipeline and specific relays. Typically, the throttle mechanisms are configured to limit or control usage of each forwarding relay and Internet or customer relay on a time period basis, such as on an hourly basis (e.g., in a 7 day by 24 hour operational framework). The actual throttling method provided by the mechanism can take a number of forms to suit particular customer environments. In one embodiment, each message transmitted in the pipeline is given a priority (e.g., commands and alarms given high priority and event and bulk data given lower priorities). The throttle mechanism operates to limit messages being transmitted for each period of time with messages being throttled relative to their assigned priority. For example, higher priority alarms may not be delayed or throttled at all by the throttle mechanism while lower priority event and bulk data may be throttled or delayed based on the amount of data previously transmitted within the current time period.

In one embodiment, the throttle mechanism relies on priority queuing mechanisms built into the system pipeline. In this arrangement, the throttle mechanism includes a user configurable file that provides a data transmittal volume per time period (e.g., a throttle set point that may have units of kilobytes per hour in a 7×24 matrix or other useful units). The throttle mechanism further includes an addition-to-relay application (e.g., a data flow counter) that functions to track data sent in each time period and initiate throttling when the throttle set point is exceeded for that time period. Importantly, the data flow counter is reset at the beginning of a transmission period, measures data flow until the throttle point is detected, and then determines time to see if more data can be sent (a new transmission period has begun) rather than performing ongoing or frequent time or other system calls.

Further, the counting or tracking may be performed only for lower priority data (or, alternatively, on an overall basis). For example, the addition-to-relay application may function to count down from the throttle point data sent in an hour or other time period for lower priority (e.g., priority 2, 3, and lower) traffic and when the counter reaches zero, initiating throttling of data at the relay until the next transmission period begins. Throttling in this sense typically involves delaying the lower priority traffic until the beginning of the next time period, e.g., next traffic monitoring or data transmission period in which the counter is reset to the throttle set point. The messages may be further controlled by the throttle mechanism to be sent in a specified order, such as first-in-first-out (FIFO).

More particularly, a method is provided for throttling transmissions of gathered system monitoring and asset data within a communications network of a customer computing environment. The method includes providing a communications relay within the network or pipeline having a downstream interface for transmitting data messages to a downstream device (such as the Internet). A data transmission throttle is also provided for controlling the downstream interface so as to transmit data at or below a data transfer threshold that defines an allowable data transfer volume per transmission period. In one embodiment, the method includes receiving customer user input and modifying the data transfer threshold based on the input, with thresholds being set for a matrix that defines a plurality of transmission periods for a standard week (such as a 24 hour by 7 day matrix with cells containing the thresholds).

The method continues with receiving gathered system monitoring and asset data and then preparing a data message from the received data. The data transmission throttle then determines whether the size of the prepared data message exceeds the threshold for the current transmission period, such as by comparing the size of the message to a data flow counter. If the threshold is not exceeded, the message is transmitted. If the threshold would be exceeded, the throttle determines with a time call if the current transmission period has passed and if so, then determines the new threshold of the new or next transmission period and repeats the message size comparison. If the transmission period has not lapsed, the message transfer is delayed until the beginning of the next transmission period.

DETAILED DESCRIPTION OF THE PREFERRED EMBODIMENTS

The present invention is directed to a method and system of providing self-monitoring services to clients to allow monitoring of operation history and status and other information regarding their computer systems and networks. More specifically, a service system is provided that includes data transmission throttle mechanisms within one or more relay in the customer environment or network to control data transmission volume and/or timing from monitored systems toward the service provider (and in some cases, to the monitored systems from the service provider). Significantly, the customer user or administrator is able to establish volume levels (or throttle set points) on an hourly or other time period (such as based on a 24 hour and 7 day week matrix) to allow the throttle to match their network usages (e.g., transmit low priority monitoring and asset data in off-peak hours).

In one embodiment, the throttle mechanism is provided only within the customer relay connecting the customer environment to the Internet or other public communication network while in other embodiments throttle mechanisms are provided in one or more of the forwarding relays in the pipeline. The customer relay (usually only one is used) and forwarding or fan-out relays are provided within the customer system to provide a link to the Internet or other communications network and to provide a cascaded pipeline that controls the transmission of data and/or messages between a monitored relay or system and a service provider system and allows the customer system to be readily scaled up and down in size to include hundreds or thousands of monitored systems and nodes. As will become clear from the following description, the forwarding relays provide a store and forward mechanism that functions to provide reliable messaging and in preferred embodiments, transmits received messages based on a priority scheme that facilitates effective and timely communication of messages and data based on assigned priorities (e.g., priorities assigned by transmitting devices such as the monitored systems or relays and the service provider system) Typically, the throttle mechanism of the invention works to utilize the customer and forwarding relays messaging stores and priority messaging to throttle data not only based on a FIFO system but also based on the priority of the data. For example, commands, event and alarm messages, and other high priority data may be sent without throttling or given priority over other data by the throttle, whereas lower priority messages are always throttled.

Figure 1:
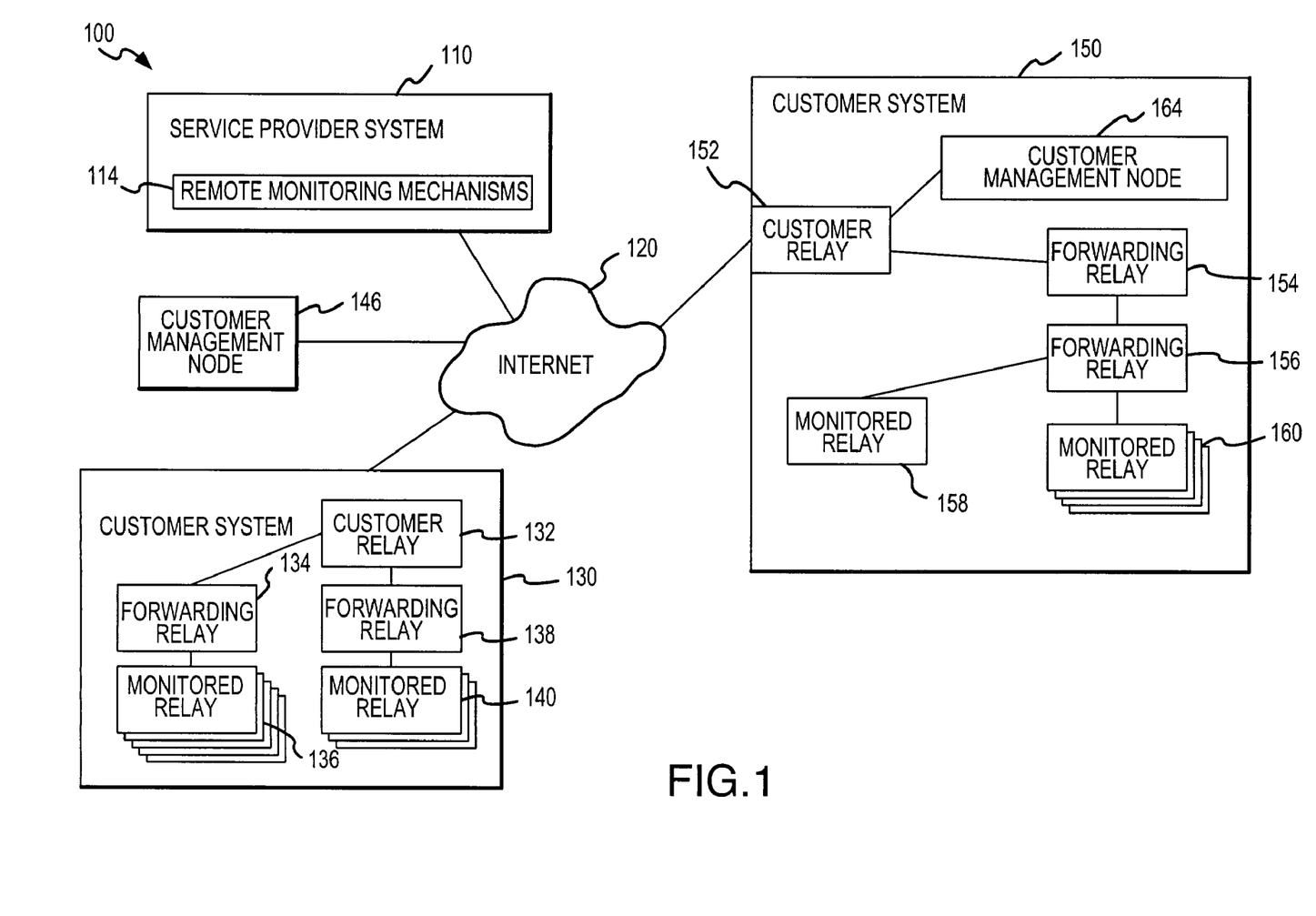
FIG. 1 illustrates a self-monitoring service system according to the present invention generally showing the use of forwarding or fan-out relays to provide scalability to link a service provider system and its services to a large number of monitored systems or relays.

The following description begins with a general description of a typical service system of the invention with reference to FIG. 1 and continues with a more specific description of the various components included within a service provider system, a forwarding relay and a similarly configured customer or Internet relay both having data transmission throttles (although in many embodiments of the invention, a throttle may be provided in one or more of the relays such as the Internet relay), and a monitored system to provide the desired functions of the invention. Exemplary data flow within, and operation of, a forwarding or Internet relay are then described fully with reference to FIGS. 3 and 4 stressing the key features of the data transmission throttle of the present invention including the use of customer input to create and modify a network utilization file setting throttle points and establishing allowed data flow from the relays.

Referring to FIG. 1, a self monitoring service system 100 is shown that provides a scalable solution to delivering self-service solutions such as system monitoring, trend reporting, and asset tracking. The system 100 includes a service provider system 110 with remote monitoring mechanisms 114 that function to process collected data and provide event, alert, trending, status, and other relevant monitoring data in a useable form to monitoring personnel, such as via customer management nodes 146, 164. The service provider system 110 is linked to customer systems or sites 130, 150 by the Internet 120 (or any useful combination of wired or wireless digital data communication networks). The communication protocols utilized in the system 100 may vary to practice the invention and may include for example TCP/IP and SNMP. The service provider system 110 and customer systems 130, 150 (including the relays) may comprise any well-known computer and networking devices such as servers, data storage devices, routers, hubs, switches, and the like. The described features of the invention are not limited to a particular hardware configuration.

According to an important aspect of the invention, the service system 100 is adapted to provide effective and load controlled data transmissions within the customer systems 130, 150 and between the service provider system 110 and the customer systems 130, 150. In this regard, the system 100 includes a cascaded pipeline architecture that includes within the customer systems 130, 150 linked customer or Internet relays 132, 152, forwarding (or intermediate or fan-out) relays 134, 138, 154, 156, and monitored relays 136, 140, 158, 160. The monitored relays 136, 140, 158, 160 are end nodes or systems being monitored in the system 100 (e.g., at which configuration, operating, status, and other data is collected). The forwarding relays 134, 138, 154, 156 are linked to the monitored relays 136, 140, 158, 160 and configured to support (or fan-out) monitored systems to forwarding relay ratios of 500 to 1 or larger. The configuration and operation of the forwarding relays 134, 138, 154, 156 and customer relays 132, 152 with included throttle mechanisms (not shown in FIG. 1) are a key part of the present invention and are described in detail with reference to FIGS. 2–4.

In one embodiment, the pipeline is adapted to control the transmission of data or messages within the system and the forwarding and customer relays act to store and forward received messages (from upstream and downstream portions of the pipeline) based on priorities assigned to the messages and to control the timing and volume of data flow in both directions (upstream and downstream) or at least in the downstream direction (toward the service provider system 110. The customer relays 132, 152 are positioned between the Internet 120 and the forwarding relays 134, 138, 154, 156 and function as an interface between the customer system 130, 150 (and, in some cases, a customer firewall) and the Internet 120 and control communication with the service provider system 110. The importance of controlling data flow at this interface is important to minimize congestion especially during the core business hours of the customer and to control load or usage costs incurred by the customer (as many communication costs can be controlled by leveling transmission loads and controlling timing, such as transmitting larger volumes in non-peak hours). Hence, a throttle is typically provided in the customer relays 132, 152 to provide the customer with control over the data flow from data gathering devices within the monitored relays 136, 140, 158, 160.

The system 100 of FIG. 1 is useful for illustrating that multiple forwarding relays 134, 138 may be connected to a single customer relay 132 and that a single forwarding relay 134 can support a large number of monitored relays 136 (i.e., a large monitored system to forwarding relay ratio). Additionally, forwarding relays 154, 156 may be linked to provide more complex configurations and to allow even more monitored systems to be supported within a customer system 130, 150. Customer management nodes 146, 164 used for displaying and, thus, monitoring collected and processed system data may be located anywhere within the system 100 such as within a customer system 150 as node 164 is or directly linked to the Internet 120 and located at a remote location as is node 146. The customer management nodes 146, 164 may also be used to input initial network utilization thresholds or throttle set points and preferably on data volume per hour or other time period basis per day of the week (e.g., providing data for a 24 by 7 matrix). In a typical system 100, more customer systems 130, 150 would be supported by a single service provider system 110 and within each customer system 130, 150 many more monitored relays or systems and forwarding relays would be provided, with FIG. 1 being simplified for clarity and brevity of description.

Figure 2:
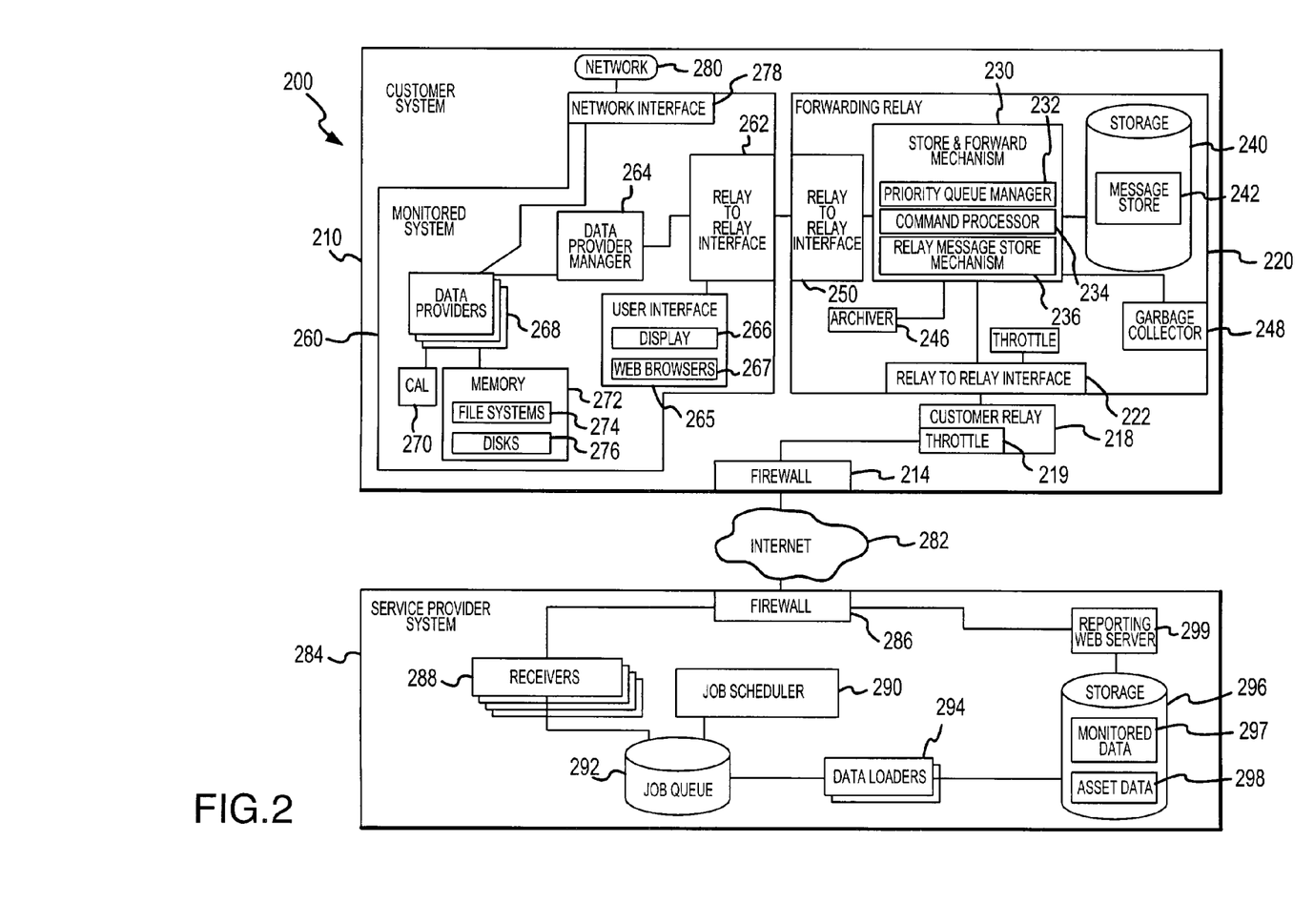
FIG. 2 illustrates one embodiment of a service system showing in detail components of the service provider system, the forwarding relay and customer relay (including data transmission throttles), and the monitored system or relay that are useful for providing prioritized and load controlled or throttled data transfer within such a service system.

FIG. 2 shows a monitoring service system 200 that includes a single customer system 210 linked to a service provider system 284 via the Internet 282. FIG. 2 is useful for showing more of the components within the monitored system or relay 260, the forwarding relay 220 and customer relay 218, and the service provider system 284 that function separately and in combination to provide the data transmission throttling and the store and forward messaging of the present invention. Although shown in simplified fashion, the customer relay 218 typically includes the throttle 219 and the components shown for forwarding relay 220 to provide store and forward features described below and with reference to FIG. 3. The customer system 210 includes a firewall 214 connected to the Internet 282 and the customer relay 218 providing an interface to the firewall 214 and controlling communications with the service provider system 284.

The customer system 210 includes a forwarding relay 220 linked to the customer relay 218 and a monitored system 260. The forwarding relay 220 and customer relay 218 provide a number of key functions including accepting data from upstream sources and reliably and securely delivering it downstream in throttled manner with throttles 219, 224. Throughout the following discussion, the storing, forwarding, and throttling features are discussed mainly with reference to forwarding relay 220 for brevity but it should be understood that these same features are provided by the customer relay in the illustrated embodiment of FIG. 2. In another preferred embodiment not shown, only the customer relay 218 would include a throttle 219. Additionally, in the following discussion, the monitored system 260 will be considered the most upstream point and the service provider system 284 the most downstream point with data (i.e., "messages") flowing downstream from the monitored system 260 to the service provider system 284.

The forwarding relay 220 accepts data from upstream and downstream sources and reliably and securely delivers it downstream and upstream, respectively, with throttling only being provided in the downstream direction (although in some embodiments two throttles 224 may be provided to throttle data flow in both directions with the same throttling set points and timing or with different set points and/or timing). The relay 220 caches file images and supports a recipient list model for upstream (fan-out) propagation of such files. The relay 220 manages the registration of new monitored systems and manages retransmission of data to those new systems. Importantly, the forwarding relay 220 implements a priority scheme to facilitate efficient flow of data within the system 200. Preferably, each forwarding relay 220 within a service system has a similar internal structure.

Figure 3:
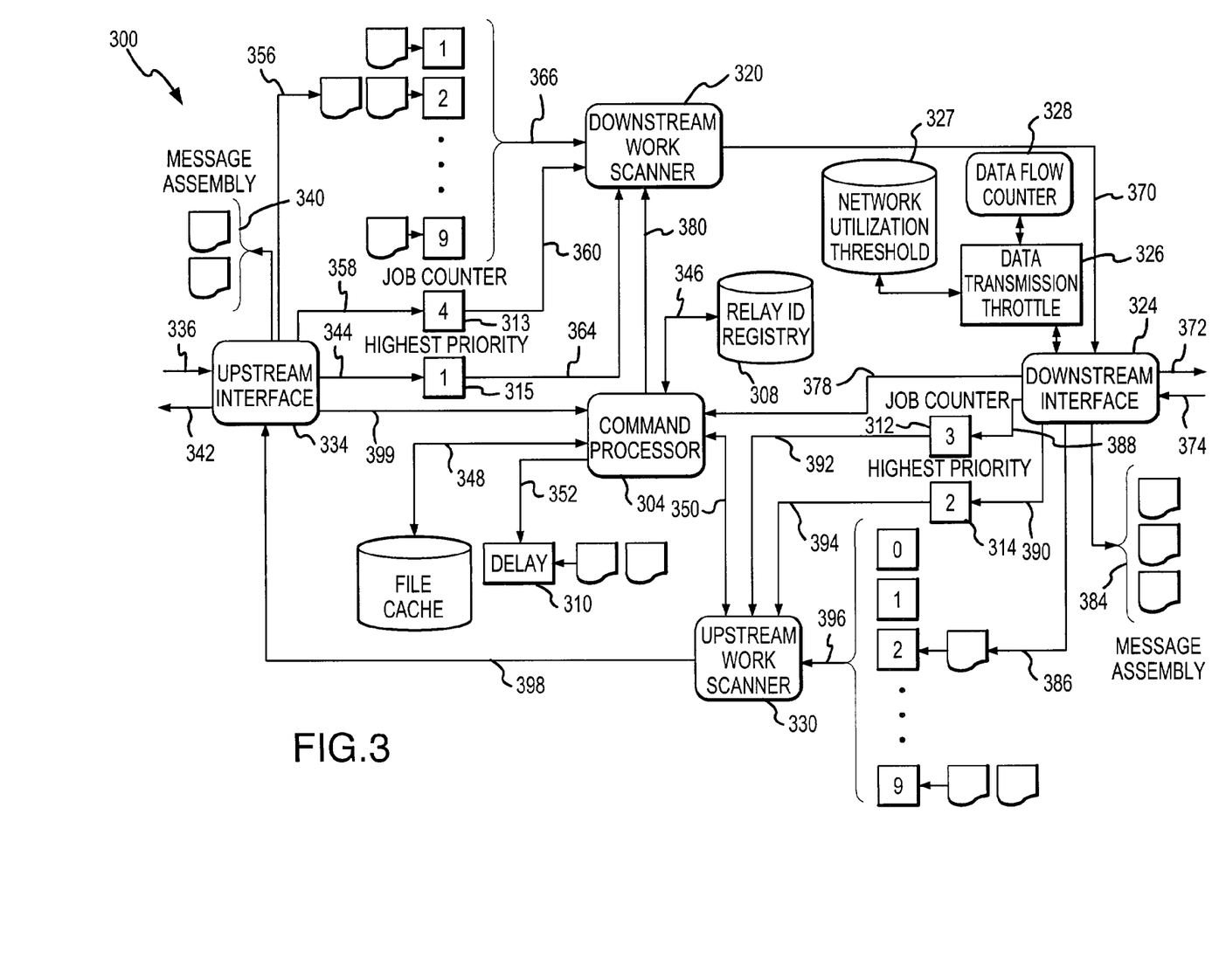
FIG. 3 is a block diagram of portions of an exemplary forwarding or customer relay illustrating data and command flow and message building using upstream and downstream message queues and illustrating throttling of downstream messages during operation of the service system of FIG. 1 or FIG. 2.

The forwarding relay 220 includes two relay-to-relay interfaces 222, 250 for receiving and transmitting messages to connected relays 218, 260. A store and forward mechanism 230 is included for processing messages received from upstream and downstream relays and for building and transmitting messages. This may be thought of as a store and forward function that is preferably provided within each relay (including relay 218) of the system 200 (and system 100 of FIG. 1) and in some embodiments, such message building and transmittal is priority based. To provide this functionality, the store and forward mechanism 230 includes a priority queue manager 232, a command processor 234, and a relay message store mechanisim 236 and is linked to storage 240 including a message store 242 (and as shown in FIG. 3, a network utilization threshold configuration file is stored for use by throttle 224 and includes user-definable throttle set points (i.e., allowable volumes of data) for each transmission period (such as an hour) for each day of the week).

Briefly, the priority queue manager 232 is responsible for maintaining a date-of-arrival ordered list of commands and messages from upstream and downstream relays. The command processor 234 coordinates overall operations of the forwarding relay 220 by interpreting all command (internal) priority messages and also acts as the file cache manager, delayed transmission queue manager, and relay registry agent (as will become more clear from the description of FIGS. 3 and 4). The relay message store mechanisim 236 acts to process received messages and commands and works in conjunction with the priority queue manager 232 to extract messages the message store 242 based on the priority queue and to control transmission of these built messages. The contents of the message store 242 are messages, and typically, there is one file per message and one message per file (e.g., a message is a file in system). The mechanism 236 functions to guarantee the safety of messages as they are transmitted within the system 200 by creating images of the messages in storage 240 and implementing a commit/destroy protocol to manage the on-disk images. In general, a "message" represents a single unit of work that is passed between co-operating processes within the system 200. The priority queue manager 232 functions to generate priority queues. This allows the relay 220 to obtain a date-ordered set of priority queues directly from the mechanism 230.

Generally, the message store 242 stores all messages or data received from upstream and downstream sources while it is being processed for transmittal as a new message. The store 242 may take a number of forms. In one embodiment, the store 242 utilizes a UNIX file system to store message images in a hierarchical structure (such as based on a monitored system or message source identifier and a message priority). The queue library, which is a part of the priority queue manager 232 and provides an interface for the manager 232, implements a doubly-linked list of elements and allows insertion to both the head and tail of the list with searching being done sequentially from the head of the queue to the tail (further explanation of the "store" function of the forwarding relay 220 is provided with reference to FIGS. 3 and 4). Messages are typically not stored in the queue library but instead message descriptors or references to the messages are used to indicate the presence of messages in the message store 242, i.e., the messages are stored on storage 240. The queue manager 232 may create a number of queues in the library such as a queue for each priority level and extra queues for held messages which are stored awaiting proper registration of receiving relays and the like. A garbage collector 248 is provided to maintain the condition of the reliable message store 242 which involves removing messages or moving messages into an archival area (not shown) with the archiver 246 based on expiry policy of the relay 220 or system 200.

The forwarding relay includes throttle 224 linked to the relay to relay or downstream interface 222 for controlling the transmission of data to the customer relay 218 (which in turn includes throttle 219 for controlling the transmission of data to the Internet 282). The operation of the throttle 224 is explained in detail with reference to FIGS. 3 and 4 but briefly operates to track the volume of data transmitted at interface 222 for each transmission period and to throttle flow whenever a throttle set point is reached within that transmission period. The throttle 224 then determines when transmission can begin again (i.e., the start of the next transmission period) and enables or stops throttling flow at that time and again begins tracking data flow from interface 222, such as by resetting a counter to the throttle set point and then decrementing the counter as data is transmitted.

The throttle set points are typically set based on customer user or administrator inputs on allowable network usage and stored in memory 240. Preferably, the throttle set points are varied based on the time of day to accommodate the heavy usage times for other communications within the customer system 210 and from the customer system 210 to the Internet 282. For example, the customer system 210 may be a business with heavy communications during the hours of 8 am to 5 p.m. on Monday through Friday. In this example, the throttle set points may be set for much lower volume to be transmitted from data providers 268 through relay to relay interface 222 and customer relay 218 during these times. In one embodiment, a 24 hour by 7 day a week matrix is used with a throttle set point or network utilization threshold being set for each hour in the matrix. The customer user can enter such settings via user interface 266 (or otherwise) and may alter initial settings to adjust for anticipated peak usages or simply to adjust for experienced internal and external network usages. Additionally, the threshold set points in the matrix may vary for each relay 220, 218 having a throttle. For example, the set points may be set higher within the customer system 210 but more tightly controlled at the customer relay 218 to suit the volume of data flowing to and from the customer system 210 to the Internet 282 (or to suit economic considerations involving usage of public communications networks). The user interface or customer management node 265 can be any system with a web browser in embodiments where the presentation of data is an HTTP-based transaction. Generally, the forwarding relay 220 and customer relay 218 are not involved in the presentation of data collected from the monitored system 260 to a user interface 265.

In some embodiments, the forwarding relay 220 with the store and forward mechanism 230 and throttle 224 functions to send information based upon the priority assigned (e.g., by the transmitting device such as the monitored system 260 or service provider system 284) to the message. Priorities can be assigned or adjusted based on the system of origination, the function or classification of the message, and other criteria. For example, system internal messages may be assigned the highest priority and sent immediately (e.g., never delayed or throttled or sent within a set time period, such as 5 minutes of posting). Alerts (or event and/or alarm messages) may be set to have the next highest priority relative to the internal messages and sent immediately (with no throttling) or within a set time period (barring network and Internet latencies) such as 5 minutes. Nominal trend data is typically smaller in volume and given the next highest priority level and throttled (i.e., included in the tracked volume of transmitted data and then throttled when appropriate until a next transmission period). High-volume collected data such as configuration and asset data is given lowest priority and always controlled by the throttle 224. Of course, the particular priorities assigned for messages within the system 200 may be varied to practice the prioritization features of the present invention. In one preferred embodiment, higher priority messages or data (such as commands and alerts) are not throttled or included within the tracked volume of data. In other preferred embodiments, the higher priority messages are included in the overall tracked transmission volume but not throttled or delayed.

The monitored system 260 typically includes components to be monitored such as one or more CPUs 270, memory 272 having file systems 274 (such as storage area networks (SANs), file server systems, and the like) and disk systems 276, and a network interface 278 linked to a customer or public network 280 (such as a WAN, LAN, or other communication network). A user interface 265 is included to allow monitoring of the monitored system 260 (e.g., viewing of data collected at the monitored system 260, processed by the service provider system 284, and transmitted back via the forwarding relay 220 to the monitored system 260) and entering throttling set points or otherwise altering the network utilization threshold file(s). The user interface 265 typically includes a display 266 (such as a monitor) and one or more web browsers 267 to allow viewing of screens of collected and processed data including events, alarms, status, trends, and other information useful for monitoring and evaluating operation of the monitored system 260. The web browsers 267 provide the access point for users of the user interface 265.

Data providers 268 are included to collect operating and other data from the monitored portions of the system 260 and a data provider manager 264 is provided to control the data providers 268 and to transmit messages to the forwarding relay 220 including assigning a priority to each message. Preferably, the data providers 268 and data provider manager 264 and the relays 220, 218 consume minimal resources on the customer system 210. In one embodiment, the CPU utilization on the monitored system 260 is less than about 0.01 percent of the total CPU utilization and the CPU utilization on the relay system is less than about 5 percent of the total CPU utilization. The data providers 268 typically collect data for a number of monitoring variables such as run queue and utilization for the CPU 270, utilization of memory 272 including information for the file systems 274 and disks 276, and collision, network errors, and deferred packets for the network interface 278. In addition to collecting monitoring variable data, the data providers 268 typically collect configuration data. The data providers 268 operate on a scheduled basis such as collecting trend data (e.g., monitoring variable information) every 10 minutes and only collecting configuration data once a week or some relatively longer period of time. The data provider manager 264 functions to coordinate collection of data by the data providers 268 and to broker the transmission of data with the relay 220.

The service provider system 284 is linked to the Internet 282 via the firewall 286 for communicating messages with the customer relay 218 and the forwarding relay 220. The service provider system 284 includes receivers 288 which are responsible for accepting data transmissions from the customer system 210 and brokering the data to the appropriate data loaders 294. Received messages or jobs are queued in job queue 292 and the job queue 292 holds the complete record of the data gathered by a provider 268 until it is processed by the data loaders 294. The job scheduler 290 is responsible for determining which jobs are run and in which order and enables loaders 294 to properly process incoming data. The data loaders 294 function to accept data from the receivers 288 and process the data into final format which is stored in storage 296 as monitored data 297 and asset data 298. The data loaders 294 are generally synchronized with the data providers 268 with, in some embodiments, a particular data loader 294 being matched to operate to load data from a particular data provider 268. The reporting web server 299 then functions to culminate all the gathered and processed data and transmit or report it to the user interface 265. The types of reports may vary but typically include time-based monitoring data for trend analysis, system configuration data for system discovery and planning, and time-based monitoring data evaluated against a set of performance level metrics (e.g., alerts) and may be in HTML or other format. The loaders and processors of service provider system 284 can also generate e-mail notifications, perform secure file transfer, or complete other such electronic transfer of data or derived data products.

Referring now to FIG. 3, a block diagram of the internal structure 300 of a forwarding or a customer relay, such as relay 218 or 220 of FIG. 2, is illustrated to more fully describe how the relays implement the throttling and priority-based messaging functions of the invention. Each relay is connected to other relays by associating a downstream interface of one relay with the upstream relay of another, with the upstream terminus of the pipeline being the data provider manager or agent and the downstream terminus of the pipeline being the receiving agents or receivers. Relays pass messages to each other, and the messages may be of a particular type, such as "command" and "data." Command messages are used to initiate certain actions on a target relay and data messages contain segments of information that are eventually assembled into files.

As shown, the internal relay structure 300 includes an upstream interface 334 that coordinates all data transmissions to and from the relay 300 in the upstream direction (i.e., toward the monitored system). A message arriving 336 at the upstream interface 334 may be a command or data message with some commands destined for the command processor 304 and some commands being relevant for the upstream interface 334, e.g., "start of msg" and "end of msg" commands. To support file transmission, upon receipt of a "start of msg" command the upstream interface 334 opens a file in its message assembly area 340. The start of message command has associated with it the priority of the file being transmitted. As data segments arrive of the same priority, they are appended to the file in the file assembly area 340. When the end of file command is received, the upstream interface 334 closes the file and places it 356 on the appropriate work queue for the downstream work scanner 320 and increases the job counter 313 indicating the number of downstream jobs pending. The priority of the message being added to the downstream queues is compared against the highest priority register 315 and if the new file is of higher priority, that new priority is written to the highest priority register 315. The upstream interface 334 also receives registration command messages which are passed to the command processor 304 and upstream acknowledgement command messages which are passed to the command processor 304 for subsequent processing. In some embodiments, the upstream interface 334 further includes or is linked to a data transmission throttle for controlling upstream communications (as is explained for data transmission throttle 326 linked to downstream interface 324). In order not to consume all the available internal or customer network bandwidth, data transmitted upstream 342 may be restricted to a predefined number of bytes per unit time, with the value of this restriction or throttle being a customer adjustable value.

The downstream work scanner 320 is provided to determine which messages are transmitted to the downstream interface 324. While the queues associated with the downstream work scanner 320 store files, the downstream work scanner 320 works with messages (with a file being composed of one message). The scanner 320 begins functioning by examining the job counter 313. When the job counter 313 is not zero there is work, and the scanner 320 reads the value of the highest priority register 315. The scanner 320 then obtains the next message (e.g., start of message, message segment, or end of message commands) from the highest priority work queue. The scanner 320 then sends the message to the downstream interface 324, such as by a block transmission (e.g., the scanner 320 waits for the message to be received prior to scanning for new work). The use of block transmissions is desirable for supporting throttling of the downstream interface 324. The scanner 320 also implements an acknowledgement handshake protocol with the upstream interface of the downstream relay (not shown). When the downstream relay sends an acknowledgement command 374, the command is sent to the command processor 304 which routes it to the downstream work scanner 320. Upon receipt of the acknowledgement command, the scanner 320 releases the file from the work queues, decrements the job counter 313, and rescans the queues for the highest priority value. The downstream interface 324 coordinates all transmissions to or from linked downstream relays (not shown). To allow the relay 300 to provide message transmission, the downstream interface 324, upon receipt of a message, transmits the message to the associated downstream relay.

Throttling is provided at the downstream interface 324 by the data transmission throttle 326 which generally enforces a limit on the amount of data that can be transmitted per unit of time. In this regard, the network utilization threshold file includes throttling set points using any useful measure of data volume or network usage such as bytes. The time period or transmission period utilized for each throttling set point also may be nearly any useful measure of time such as per second, per minute, per hour or some combination thereof. To limit the number of system calls that are needed to determine when the beginning of a next transmission period, one embodiment uses transmission periods of one hour. A single threshold or set point may be utilized for each relay throttle 326 or more preferably, a matrix of such set points is provided in the thresholds 327. The matrix may take numerous forms such as providing a different set point for each day or for groups of days or be provided to vary throughout each day to better match the network usages of the customer. In one embodiment, a 24 hour by 7 day a week matrix is provided with one-hour data transmission periods. A threshold or throttling set point is entered in each block of the matrix setting an allowed volume of data for that particular transmission period. In this manner, the customer can set lower thresholds during their core business hours (such as 8 am to 5 p.m. or 5 p.m. to 10 p.m., and the like for their particular time zone to account for international customers) during particular days.

The data flow counter 328 is provided to track the actual data flow or transmissions volume from the downstream interface 324 per transmission period. During operations, the data flow counter 328 is preferably designed to limit the number of system calls that are performed to track data flow. With this goal in mind, the counter 328 operates at the beginning of each transmission period to retrieve the threshold for the present transmission period from the thresholds file 327 and set a decremental counter to this value (alternatively, the counter 328 may use an additive counter and comparator to the threshold value). Prior to transmitting data from the downstream interface 324, the data transmission throttle 326 communicates with the counter 328 to verify that the threshold will not be exceeded by the particular message or data transmission. If not, the message or data is transmitted and the data flow counter 328 acts to decrement the counter by the size of the transmitted message. If the threshold will be exceeded, the counter 328 or throttle 326 determines the current system time with a call and compares this with a calculated time for the start of the next transmission period.

If determined to be within the same transmission period, the counter 328 determine a delay period for the message until the next transmission period and informs the downstream interface 324 when transmission of the message may begin. At that time the data transmission throttle, sets its decremental counter to the throttling point for that period as indicated in thresholds file 327. If the counter 328 determines that the next transmission period has begun, the counter 328 acts to reset its internal decremental counter to the threshold value for this period and informs the downstream interface 324 that the next message may be transmitted and upon transmission decrements the internal counter. With this throttling arrangement, the number of time calls is kept very small with some transmission periods sometimes "borrowing" from a previously light transmission period (i.e., low volume data flow may result in the decremental counter not reaching the threshold value until a fraction of the next period has past but the decremental counter is then reset, resulting in the present period or matrix block having a volume greater than normally allowed for a matrix block). However, the data flow in two consecutive blocks or periods will typically be less than or equal to the combined threshold values for those blocks. The use of smaller transmission periods (such as less than an hour) results in less variance or "peaking" in the transmission periods but should be balanced with the need for additional time calls. Alternatively, additional time calls or additional mechanisms may be used to determine the beginning of each transmission period or block of the throttling matrix and when identified, the counter 328 acts to reset its internal decremental clock to the new threshold value.

In one embodiment, higher priority messages, such as priority 0 and 1 messages, are not included within the volume counted or tracked by the data flow counter 328 and are not throttled when the threshold is exceeded. In other embodiments, these higher priority messages are included within the tracked data flow volume but are still not throttled. Clearly, the specific use of priorities with the throttle mechanism 326 may be varied significantly to practice the invention or may be eliminated entirely. For example, in some embodiments, a separate matrix is provided for each priority.

During message reception, the interface 324 accepts messages 374 from the downstream relay (not shown) destined for the relay 300 or for upstream relays (not shown). The messages are routed in the same manner as the upstream interface 334 routes received messages but for two exceptions. First, upstream messages contain a recipient list of relay identifiers. These recipient lists have been implemented to reduce the duplication of data being transmitted to the intermediate or forwarding relays. Second, some upstream messages are actually command messages destined for upstream systems and have a priority of zero (highest priority) and a recipient list that includes upstream relay identifiers.

The upstream work scanner 330 is included to determine which messages are transmitted to the upstream interface 334 for transmittal to upstream relays (not shown). During message transmission, the scanner 330 examines the job counter 312 and when not zero, the scanner 330 reads the value of the highest priority register 314. The scanner 330 then obtains the next message (e.g., start of message, data, or end of message commands) from the highest priority work queue 396. The scanner 330 then sends the retrieved message to the upstream interface 334, such as by blocked transmission (e.g., by waiting for receipt of message prior to scanning for new work) to support throttling at the upstream interface 334. The scanner 330 implements an acknowledgement handshake protocol with the downstream interface of the immediate upstream relay 336 (not shown) and when an acknowledgement command is received from the upstream relay it is first sent to the command processor 304 and then routed to the scanner 330. Upon receipt of the acknowledgement, the scanner 330 releases the file from the work queues 396, decrements the job counter 312, and rescans the queues for the highest priority value. In some cases, it may not be possible to send a message to one or more of the upstream relays identified by the recipient list of the message. In this case, the scanner 330 passes the message to the command processor 304 for insertion in the delay queue 310. At some future time, the command processor 304 re-inserts a delayed transmission based on the registration of a recipient relay and the scanner 330 then accepts the message from the command processor 304 and re-queues it on the appropriate priority queue.

The command processor 304 acts as the overall coordinator of operations within the relay 300 and acts as the file cache manager, the delayed transmission queue manager, and the relay registry agent. The command processor 304 handles the processing of most command messages (with the exception of start of file and end of file command messages) within the relay 300. The most commonly processed command is the file acknowledgement command that indicates that the upstream or downstream recipient relay has received a complete file. When this command is received, the command processor 304 notifies the corresponding work scanner 320 or 330 to release the file from the work queues.

The command processor 304 acts as a file cache manager and in one embodiment, acts to only cache the current version of any software or configuration files in relays 300 with no children, as the file caches of parent relays hold all the files contained in child relays due to the hierarchical nature of the pipeline. Parents of such childless relays 300 will cache the current and previous versions of any software or configuration files. Since there exists within systems according to the invention the possibility that not all designated recipients of a message will be able to receive it, the command processor 304 is configured to manage delayed transmissions without adversely affecting other message traffic. If an upstream work scanner 330 is unable to deliver a message to a recipient, the file associated with that message is passed to the command processor 304 for inclusion on its delayed transmission queue 310. The command processor 304 further acts as a relay registry agent by making a record of the relay identifier of the registrant for storage in registry 308 when an upstream relay becomes active and sends a registration message to its downstream relay. The registration command message also includes a list of all configuration and software versions associated with the upstream relay. This list is compared by the command processor 304 to the list of required versions maintained in the file cache 348. Any upgrades in software or configuration files are sent by the command processor 304 to the upstream work scanner 330 for insertion onto the appropriate queues. The delayed transmission queue 310 is then scanned to determine if there are any messages on the queue that are destined for the new registrant. If so, these messages are passed to the upstream work scanner 330 for insertion onto the appropriate queues.

Figure 4:
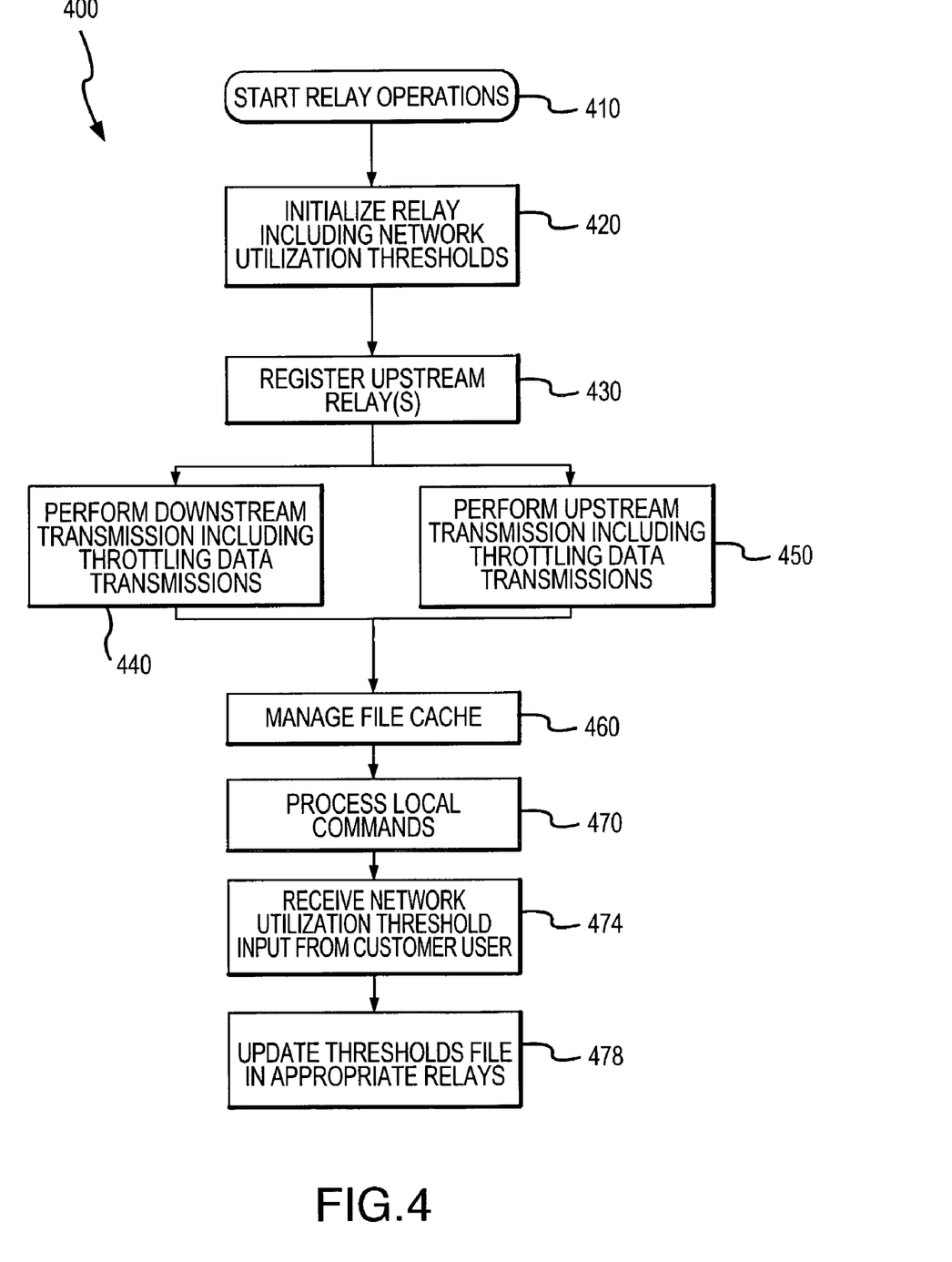
FIG. 4 is a flow chart showing processes performed by a forwarding or customer relay, such as the relay shown in FIG. 3, during operation of the service system of FIG. 1 or 2.

Referring now to FIG. 4 with further reference to FIG. 3, several of the processes or functions performed by an operating forwarding or customer relay (such as relays 218 and 220 of FIG. 2 and 300 of FIG. 3) are more fully described to stress the important features of the invention. At 410 relay operations begin and the relay is initialized at 420. Initialization 420 of a relay starts with the command processor 304 and continues until the relay 300 is in a mode where it is ready to receive and transmit data with upstream relays and it is registered and ready to exchange data with downstream relays. After the command processor 304 is instantiated, the command processor 304 acts to clear 346 the relay identification registry 308. The command processor 304 then moves 352 all files that were placed upon the delayed transmission queue 310 to the upstream file queue area. The job counters 312, 313 are then reset to zero and the highest priority registers 314, 315 are set to zero.

Initialization 420 continues with starting the downstream work scanner 320 in its initialization state. In this state, the downstream work scanner 320 rebuilds the downstream job queues from images on the disk. Once the queues have been rebuilt, the downstream work scanner 320 sets the job counter 313 and the highest priority register 315 to the appropriate values.

The network utilization threshold file 327 is provided with default throttling set points in a default matrix (such as a number of bytes per hour). Typically, default values are the same data transfer rate for each block in the throttling matrix although an assumption may be made of a typical customer's higher network usage rates and lower threshold values provided at these times in the matrix. At 420, the customer user may also provide input (via an interface or via an operator of the service provider) to tailor the throttling set points or thresholds to suit the communication and business needs of the customer. This generally involves setting lower data transfer rates during core business hours and very high data transfer rates during times when the customer has no or little network usage.

Initialization continues at 420 with the scanner 320 then begins to process the transmission of the highest priority file on the queues. The downstream interface 324 then starts in its initialization state which causes it to issue a registration request 372 to the downstream relay. The upstream work scanner 330 is started in its initial state where it rebuilds its work queues, including those files that have been restored from the delayed transmission queue 310, and sets the job counter and the highest priority registers 312, 314 appropriately. The upstream work scanner 320 then processes the first file on the upstream work queues 396. Next, the upstream interface 334 is instantiated and conditions itself to accept connections and messages from upstream relays.

For proper pipeline communications, downstream relays need to know that an upstream relay has been initialized. In order to support this, the downstream relay processes at 430 registration requests from upstream relays. The upstream interface 334 receives a start of message command 336 and opens a message in the message assembly area 340. As additional data messages 336 are received, they are appended to the file in the message assembly area 340. When an end of message command 336 is received, the message in the message assembly area 340 is closed and the upstream interface 334 generates an acknowledgement message 342 to the upstream relay. The command message is passed 399 to the command processor 304. This message contains all the information required to register the upstream relay including a list of all configuration file versions, relay and agent versions, and provider versions.

The relay is registered 346 by the command processor 304 with the relay identification registry 308. The version information supplied by the upstream relay is compared at 348 to the configuration file information in the file cache and any deviations are noted. All deviations are corrected by transmitting 350 the new files from the cache to the upstream work scanner 330 for insertion 396 into the appropriate transmission queues. The command processor 304 then scans 352 the delayed work queue 310 to determine if any files contained on that queue 310 are destined for this newly registered relay. If delayed transmission files are found, they are passed 350 to the upstream work scanner 330 for insertion onto the appropriate work queues.

Downstream transmission at 440 encompasses an initial setting of the internal counter at the threshold value or throttling set point for the current transmission period. Then, the transmission of data from an upstream (customer system) source to a downstream destination (service provider system) through a relay may begin. As discussed previously, the relay 300 supports a throttling mechanism and a store-and-forward mechanism as well as a priority messaging system to provide enhanced safe delivery of data and with acceptable timing. Transmission 440 includes the upstream interface 334 receiving 336 a start of message command. The upstream interface 334 creates a new message in the message assembly area 340 to store the incoming message. The upstream interface 334 then receives a series of data messages 336. If the priority of the received data message matches the priority of the message 340, the data segment of the data message is appended to this message 340. The upstream interface 334 then receives an end of message command 336 at which point the interface 334 closes the message 340 and issues an acknowledgement command 342 to the upstream relay. The completed message is then added at 356 to the end of the appropriate downstream transmission work queue and the job queue counter 313 is incremented. The priority of this new message is compared 344 to the highest priority register 315 and if the new message has a higher priority, the highest priority register 315 is updated with the new, higher priority.

The downstream work scanner 320 then examines 360 the job counter register 313 to determine whether there is work pending. If work is determined to be pending, the scanner 320 obtains the value of the highest priority register 315. The file at the head of the highest priority queue is then accessed 366 and if there is no more work on this queue, the next queue is accessed and the highest priority register 315 is adjusted (decremented). If there is work on this queue but no open file, then a file is opened and the downstream work scanner or processor 320 issues a start of message command. If there is an open file, the next segment of the file is obtained by the scanner 320. If there is no more data in the file, the downstream work scanner 320 closes the file and issues an end of message command and a status of "waiting for acknowledgment" is set on the file. The message containing the command or data segment is transmitted 370 to the downstream interface 324 (e.g., as a blocked I/O operation).

The downstream interface 324 accepts the message and the data transmission throttle 326 verifies with the data flow counter 328 whether this message can be sent without exceeding the value of the decremental counter. If not, the interface 324 transmits 372 it to the downstream relay and the data flow counter 328 decrements the decremental counter by the size of the message. If the message would exceed the value on the decremental counter, the data transmission throttle 326 (or counter 328) transmits a time call and determines whether the next transmission period has begun. If it has, then the decremental counter is set to the new transmission period throttling set point and the message transmitted. Otherwise, a delay period is determined prior to sending the message and the interface 324 is notified. In priority based throttling embodiments, if the message is a higher priority message (such as a 0 or 1 priority message discussed above) the message is transmitted by the downstream interface 324 without notification to the throttle 326.

Once the end of message command has been transmitted 372, the downstream relay responds with an acknowledgment command 374 which is passed 378 to the command processor 304. The command processor 304 then routes 380 the acknowledgement to the downstream work scanner 320 which then removes 366 the message from the downstream queues. The scanner 320 also decrements 360 the job counter 313 to reflect completion of the transmission 440.

Upstream transmission 450 deals with the transfer of data from a downstream source to an upstream relay and is similar to downstream transmissions except that upstream messages include lists of recipient systems. Additionally, throttling is typically not provided for upstream transmission but if provided would operate in a similar fashion to downstream throttling and may have the same or different throttling set points. Preferably, the relay 300 is configured to continue to make efforts to deliver the messages to each of the systems on the list and to forward commands to upstream relays (even when not yet registered). The transmission 450 begins with the downstream interface 324 receiving 374 a start of message command. The downstream interface 324 responds by creating a new message in the message assembly area 384 to store the incoming message. The downstream interface 324 then receives a series of message segments 374 and if the priority of the received message segments match the priority of this message the message segment is appended to this message. The downstream interface 324 then receives an end of message command 374 and closes the message 384 and issues an acknowledgement command 372 to the downstream relay.

The complete message is added at 386 to the end of the appropriate upstream transmission work queue and commands destined for upstream relays are also queued. The job queue counter 312 is incremented 388 and the priority of the new message is compared 390 to the highest priority register 314. If the new message has a higher priority than the highest priority register 314, the highest priority register 314 is updated with the new, higher priority. The upstream work scanner 330 examines 392 the job counter register 312 to determine whether there is work pending and if so, the scanner 330 obtains 394 the value of the highest priority register 314. The message at the head of the highest priority queue is accessed 396 and if there is no more work on this queue, the next queue is accessed and the highest priority register 314 is adjusted. If there is work on this queue but no open message, then the file is opened and the upstream work scanner 330 issues a start of message command. If there is an open message, the next segment of the message is obtained by the scanner 330. If there is no more data in the message, the scanner 330 closes the message and issues an end of message command and a status of "waiting for acknowledgement" is set on the message.

The message containing a command or data segment is transmitted 398 to the upstream interface 334 (e.g., a blocked I/O operation). The upstream interface 334 accepts the message and transmits it 342 to the upstream relay. If the interface 334 is unable to contact the recipient, the upstream work scanner 330 is notified of the failure and the recipient is marked as "unavailable" on the recipient list. Once the end of message command has been transmitted 342, the upstream relay responds with an acknowledgement command 336, which is passed 399 to the command processor 304. The command processor 304 then routes 350 the acknowledgement to the upstream work scanner 330 which proceeds to repeat transmission steps until all recipients have been sent the message. If all recipients have received the message, the upstream scanner 330 removes the message at 396 from the upstream queues and decrements the job counter 312 to reflect the completion of the transmission. If any message is not delivered by the upstream interface 334, a copy of the message is sent 350 to the command processor 304 which stores the message 352 in the delayed transmission queue 310.

The relays act to perform file cache management at 460 which allows for the remote management of each relay's file or message cache. The relay has a file cache to minimize the number of transmissions that must traverse the entire pipeline. The downstream interface 324 receives a command message 374 from the downstream relay indicating the start of a cached file or message. The interface accepts the transmission and rebuilds the message image in the message assembly area 284. Upon receipt of the end of message command 374, the downstream interface 324 sends an acknowledgment command 372 to the downstream relay. The interface 324 then passes the command 378 to the command processor 304 which interprets the command and takes the appropriate actions upon the cache file 348, such as adding the message to the cache, removing a message from the cache, returning a list of the file cache contents, and the like. Any responses generated by the command processor 304 are sent 380 to the downstream work scanner 320 for further processing.

The forwarding relays also process local commands at 470 which are command messages addressed to the local or receiving relay. The downstream interface 324 receives a start of command message 374 and opens a message in the message assembly area 384 to hold it. Subsequent data messages are appended to the open message until an end of message command is received 374. Then, the downstream interface 324 generates an acknowledgement message for the command file 372. The command file is then passed 378 to the command processor 304 for processing. Any responses generated by the command processor 304 for transmittal to the downstream relay or message source are passed 380 to the downstream work scanner 320 for further processing.

At 474, the user inputs, such as via a web page form and at user interface 266, modifications or updates to the network utilization thresholds 327. This feature allows the user to adjust the throttle 326 in response to experienced congestion or delays, to accommodate changes to the customer environment, and/or periodically to adjust for seasonal or periodic fluctuations in network usage. At 478, the thresholds file 327 is updated and the data flow counter 328 then uses these new values to set the decremental counter used for tracking the maximum data transfer rate per unit of time (i.e., per transmission period). The specific order of these processes (such as 440, 450, 460, 470, 474, and 478) may vary and typically may completed concurrently.

Due to the importance of the priority messaging function within the forwarding relays and receivers of the invention, the following further description of one embodiment of data transmission is provided. Messages containing data to be sent upstream or downstream are added to the end of FIFO queues. The appropriate FIFO queue is selected based upon the priority assigned (by the sending device based on the corresponding process) to the message. In one embodiment, processes have a range of priorities spanning the priority value range (such as 1–9 with 1 being the highest priority and 9 the lowest). A special priority of zero is often reserved for use with control messages. The work scanners (or scanner processes) start looking at the FIFO queues beginning with the priority indicated in the highest priority register (or alternatively by starting each time with the highest priority FIFO queue, i.e., the zero priority queue). If a message is found, a segment of the message is sent to the appropriate relay interface. The work scanner then goes to the highest priority register (or directly to the appropriate queue) to determine which is presently the highest priority message to be sent. This priority messaging design allows higher priority work and messages to be processed as soon as it is received at the relay (e.g., within the next work cycle of the work scanner) and allows for the gradual transfer of lower priority, larger message that otherwise may block the pipeline (delay high priority messages).

The receiver is responsible for coordinating the reassembly of the segments or messages into a copy of the originally sent message. Similar to the forwarding relay, the receiver manages a set of priority elements but generally only has one message open for any particular priority. The receiver listens to transmissions from the pipeline and examines the priority of segments received. If there is no message associated with a segment's priority, the receiver creates a new message and adds the segment as the first element of the message. If a message already exists for the priority level, the receiver simply appends the segment to the end of the existing message. When an end of message command is received, the receiver closes the file for that priority and places the information in the job queue to indicate that the message is available for subsequent processing.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. A method for throttling transmission of gathered system monitoring and asset data within a communications network in a customer computing environment, comprising:

providing a communications relay within the communications network, wherein the communications relay includes a downstream interface for transmitting data messages to a downstream device and a data transmission throttle for controlling the downstream interface to transmit data at less than about a data transfer threshold defining an allowable data volume per transmission period;

receiving the gathered system monitoring and asset data at the communications relay for forwarding to the downstream device;

preparing a data message from the received data for transmittal by the downstream interface;

with the data transmission throttle, determining whether transmittal of the data message would exceed a data transfer threshold for a current transmission period, the data transfer threshold defining a quantity of data and the determining comprising finding a size of the data message and comparing the data message size with the data transfer threshold for the current transmission period, and wherein the determining comprises identifying the data message as having a low priority or a high priority and wherein when the data message is identified as having a high priority excluding the data message size from a quantity of data sent for the current transmission period and not performing the comparing of the data message size with the data transfer threshold by the data transmission throttle; and based on the determining, transmitting the data message with the downstream interface when the data transfer threshold is not exceeded or waiting a delay period and then transmitting the data message with the downstream interface.

2. The method of claim 1, wherein the delay period is calculated by the data transmission throttle to coincide the transmission with about a start of a next transmission period.

3. The method of claim 2, wherein a data transfer threshold of the next transmission period differs from the data transfer threshold of the current transmission period.

4. The method of claim 2, further including modifying the data transfer thresholds based on input from a user of the customer computing environment.

5. The method of claim 1, further including providing a network utilization matrix comprising for each day of the week a plurality of cells with a data transfer threshold.

6. The method of claim 5, wherein each of the cells corresponds to an hour of each day of the week and wherein the data transfer threshold for each of the cells is independently defined.

7. The method of claim 1, wherein the data transmission throttle includes a transmission counter initially set based on the data transfer threshold of the current transmission period and further including after the waiting a delay period and then transmitting the data message, reselling the transmission counter based on a data transfer threshold of a current transmission period and adjusting the transmission counter to reflect a size of the transmitted data message.

8. The method of claim 7, wherein the transmission counter is a decremental counter and further including after the transmitting the data message decrementing the transmission counter by a size of the transmitted data message.

9. A data communication relay, comprising:

a relay interface for transmitting digital data messages;

a memory device storing a plurality of throttling set points defining a plurality of data transfer rates providing a volume of data per transmission period;

a data flow counter configured for being set to one of the throttling set points and being decremented to indicate data transferred from the relay interface;

a throttle mechanism adapted to control the relay interface by determining a current transmission period, retrieving a throttling set point for the current transmission period, setting the data flow counter to the throttling set point, and determining prior to the relay interface transmitting a digital data message whether the size of the digital data message is greater than the data flow counter; and priority queues storing the transmitted data in files based on priorities including at least a queue designated as a low priority queue and a queue designated as a high priority queue and wherein data from the low priority queue included in the transmitted digital data message is used by the throttle mechanism in the setting of the data flow counter while data from the high priority queue is excluded by the throttle mechanism from the data flow counter and is not considered in the determining of whether the digital data message size is greater than the data flow counter.

10. The relay of claim 9, wherein the throttle mechanism is further adapted to decrement the data flow counter after the relay interface transmits the digital data message by the size of the message.

11. The relay of claim 10, wherein the throttle mechanism is further adapted when the size of the digital data message is greater than the data flow counter, to perform a system time call to determine whether a time returned from the system time call is within the current transmission period and if determined within the current transmission period, delaying transmitting of the digital data message until a next transmission period.

12. The relay of claim 11, wherein the throttle mechanism is further configured to operate if the returned time is in the next transmission period to retrieve a throttling set point for the next transmission period, to reset the data flow counter to the retrieved throttling set point, to compare the size of the digital data message to the data flow counter, and when the size is smaller than the data flow counter, to enable transmission of the digital data message and to decrement the data flow counter by the size of the digital data message.

13. A customer-based service system for providing self-service tools from a central service provider node linked to a data communications network to customer environments via the communications network, comprising:
  a communication pipeline within a customer environment adapted for digital data transfer;
  a plurality of monitored relays linked to the pipeline comprising end nodes running at least a portion of the provided self-service tools;
  a forwarding relay linked to the pipeline upstream of the monitored relays adapted to control flow of data transmitted from the monitored relays to the service provider node, wherein the forwarding relay includes means for storing the transmitted data and selectively forwarding the stored data on the pipeline; and
  a customer relay linked to the pipeline and to the communications network providing a communication interface between the forwarding relay and the service provider node, wherein the customer relay includes a data transmission throttle operating to maintain volumes of the forwarded data to the communications network per transmission period below about a network utilization threshold;
  wherein the storing and forwarding means of the forwarding relay comprises priority queues for storig the transnitted data in files based on priorities including at least a queue designated as a low priority queue and a queue designated as a high priority queue and wheein the forwarded data from the low priority queue is included in the forwarded data volumesby the data transmission throttle while the forwarded data from the high priority queue is excluded by the data transmission throttle from the forwarded data volumes.

14. The system of claim 13, wherein the data transmission throttle includes memory storing a plurality of values for the network utilization threshold corresponding to a plurality of the transmission periods, the transmission periods corresponding to a period of time for each day of a week and the values differing for at least some of the transmission periods.

15. The system of claim 13, wherein the data transmission throttle includes a data flow counter adapted to be set at the network utilization threshold and decremented for a size of each message of the forwarded data transmitted from the customer relay to the communications network, and wherein the data transmission throttle blocks at least a portion of the forwarded data from being transferred from the customer relay when the data flow counter is decremented to zero during a transmission period.

16. The system of claim 15, wherein the data transmission throttle is further functions to determine a current transmission period based on a system time call and to block the portion of the forwarded data for a delay period until a next transmission period or to reset the data flow counter to a network utilization threshold of the current transmission period and release the blocking of the portion.

* * * * *

UNITED STATES PATENT AND TRADEMARK OFFICE
CERTIFICATE OF CORRECTION

| | |
|---|---|
| PATENT NO. | : 7,231,455 B2 |
| APPLICATION NO. | : 10/179752 |
| DATED | : June 12, 2007 |
| INVENTOR(S) | : Richard Marejka and Dean Kemp |

It is certified that error appears in the above-identified patent and that said Letters Patent is hereby corrected as shown below:

Column 20, line 18, "reselling" should be --resetting--

Column 21, line 31, "storig" should be --storing--

Column 21, line 31-32, "transnitted" should be --transmitted--

Column 22, line 2, "wheein" should be --wherein--

Column 22, line 4, "volumesby" should be --volumes by--

Signed and Sealed this

Seventh Day of August, 2007

JON W. DUDAS
*Director of the United States Patent and Trademark Office*